United States Patent
Xu et al.

(10) Patent No.: US 11,561,640 B2
(45) Date of Patent: Jan. 24, 2023

(54) TOUCH SUBSTRATE, DRIVING METHOD THEREOF AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Jiawei Xu, Beijing (CN); Bisheng Li, Beijing (CN); Taofeng Xie, Beijing (CN); Wenjin Fan, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 17/057,189

(22) PCT Filed: Jan. 20, 2020

(86) PCT No.: PCT/CN2020/073165
§ 371 (c)(1),
(2) Date: Nov. 20, 2020

(87) PCT Pub. No.: WO2020/168890
PCT Pub. Date: Aug. 27, 2020

(65) Prior Publication Data
US 2021/0311583 A1     Oct. 7, 2021

(30) Foreign Application Priority Data
Feb. 22, 2019   (CN) .......................... 201910133049.7

(51) Int. Cl.
*G06F 3/044*   (2006.01)
*G06F 3/046*   (2006.01)
*G06F 3/041*   (2006.01)

(52) U.S. Cl.
CPC ............ *G06F 3/0416* (2013.01); *G06F 3/046* (2013.01); *G06F 3/0443* (2019.05); *G06F 2203/04112* (2013.01)

(58) Field of Classification Search
CPC ...... G06F 3/0416; G06F 3/0443; G06F 3/046; G06F 2203/04112
See application file for complete search history.

(56) References Cited

U.S. PATENT DOCUMENTS 9,005,997 B2   4/2015   Bang et al.
9,639,220 B2   5/2017   Wang
(Continued)

FOREIGN PATENT DOCUMENTS

CN   102270040 A   12/2011
CN   103941946 A   7/2014
(Continued)

OTHER PUBLICATIONS

China Patent Office, First Office Action dated Feb. 27, 2020, for corresponding Chinese application 201910133049.7.

*Primary Examiner* — Julie Anne Watko
(74) *Attorney, Agent, or Firm* — Houtteman Law LLC

(57) ABSTRACT

There is provided a touch substrate including a base substrate and at least one touch unit on the base substrate. Each touch unit includes capacitive touch electrodes including a first electrode and a second electrode and electromagnetic touch electrodes including a third electrode and a fourth electrode. An insulating layer is between the first and second electrodes. A resistance of a material of each of the electromagnetic touch electrodes is changed when a magnetic field where the electromagnetic touch electrode is located is changed. The insulating layer further extends between the third and fourth electrodes. The third and first electrodes are spaced apart from each other and are side by side on a same side of the base substrate, and the fourth and second elec- (Continued)

trodes are spaced apart from each other and are side by side on a side of the insulating layer distal to the base substrate.

18 Claims, 6 Drawing Sheets

(56) References Cited

U.S. PATENT DOCUMENTS

| | | | |
|---|---|---|---|
| 9,830,012 B2 | 11/2017 | Yang | |
| 2003/0122788 A1* | 7/2003 | Sharma | G06F 3/046 345/173 |
| 2005/0083728 A1* | 4/2005 | Sharma | G06F 3/046 365/158 |
| 2011/0298452 A1 | 12/2011 | Mao et al. | |
| 2013/0009907 A1* | 1/2013 | Rosenberg | G06F 3/046 345/174 |
| 2013/0278548 A1 | 10/2013 | Weng et al. | |
| 2015/0055308 A1 | 2/2015 | Lim et al. | |
| 2016/0179266 A1* | 6/2016 | Yang | G06F 3/0446 345/174 |
| 2017/0115792 A1 | 4/2017 | Nishimura et al. | |
| 2017/0269770 A1 | 9/2017 | Ogawa | |
| 2019/0012016 A1 | 1/2019 | Kurasawa et al. | |

FOREIGN PATENT DOCUMENTS

| | | |
|---|---|---|
| CN | 104049814 A | 9/2014 |
| CN | 105487736 A | 4/2016 |
| CN | 106662957 A | 5/2017 |
| CN | 106843624 A | 6/2017 |
| CN | 107636572 A | 1/2018 |
| CN | 107710112 A | 2/2018 |
| CN | 207302013 A | 5/2018 |
| CN | 108664175 A | 10/2018 |
| CN | 109885202 A | 6/2019 |
| TW | 201344536 A | 11/2013 |
| TW | M497814 A | 3/2015 |

* cited by examiner understand # TOUCH SUBSTRATE, DRIVING METHOD THEREOF AND DISPLAY DEVICE

CROSS REFERENCE TO RELATED APPLICATIONS

This is a National Phase Application filed under 35 U.S.C. 371 as a national stage of PCT/CN2020/073165 filed on Jan. 20, 2020, an application claiming the priority of Chinese patent application No. 201910133049.7, filed on Feb. 22, 2019, the content of each of which is incorporated herein by reference in its entirety.

TECHNICAL FIELD

The present disclosure relates to the field of display technologies, and in particular, to a touch substrate, a driving method thereof, and a display device.

BACKGROUND

In the related art, an electromagnetic touch display panel generally includes a back-attached electromagnetic antenna board, i.e., an electromagnetic antenna board capable of independently realizing an electromagnetic touch function is integrated into the display panel. The antenna board includes metal wires which are vertically and horizontally spaced apart from each other and are arranged side by side, and a position where an electromagnetic touch occurs is determined by sensing an induced electromotive force when an electromagnetic pen slides on the display panel.

SUMMARY

An aspect of the present disclosure provides a touch substrate, which includes a base substrate and at least one touch unit on the base substrate, wherein
each of the at least one touch unit includes capacitive touch electrodes and electromagnetic touch electrodes;
the capacitive touch electrodes include a first electrode and a second electrode, and an insulating layer is between the first electrode and the second electrode;
a resistance of a material of each of the electromagnetic touch electrodes is changed when a magnetic field where the electromagnetic touch electrode is located is changed, the electromagnetic touch electrodes include a third electrode and a fourth electrode, and the insulating layer further extends between the third electrode and the fourth electrode; and
the third electrode and the first electrode are spaced apart from each other and are side by side on a same side of the base substrate, and the fourth electrode and the second electrode are spaced apart from each other and are side by side on a side of the insulating layer distal to the base substrate.

In an embodiment, the third electrode and the fourth electrode are at staggered positions, respectively, and the first electrode and the second electrode are at staggered positions, respectively.

In an embodiment, in each of the at least one touch unit, the third electrode includes a first portion, a second portion and a third portion spaced apart from each other along a first direction, the second portion includes a plurality of sub-portions spaced apart from each other along a second direction, the first electrode is between the first portion, the second portion and the third portion and has a plurality of openings for housing the plurality of sub-portions, respectively, and the first direction is perpendicular to the second direction.

In an embodiment, in each of the at least one touch unit, the fourth electrode includes a plurality of fourth portions spaced apart from each other along the first direction and a plurality of fifth portions spaced apart from each other along the second direction, and the second electrode is between the plurality of fourth portions and between the plurality of fifth portions.

In an embodiment, each of the first electrode, the second electrode, the third electrode and the fourth electrode is distributed in a grid.

In an embodiment, a mesh of the grid of the first electrode, a mesh of the grid of the second electrode, a mesh of the grid of the third electrode, and a mesh of the grid of the fourth electrode have a same shape and a same area.

In an embodiment, the first electrode and the third electrode form a grid, and meshes of the grid formed by the first electrode and the third electrode have a same shape and a same area; and
the second electrode and the fourth electrode form a grid, and meshes of the grid formed by the second electrode and the fourth electrode have a same shape and a same area.

In an embodiment, the shape and the area of each of the meshes of the grid formed by the first and third electrodes are equal to the shape and the area of each of the meshes of the grid formed by the second and fourth electrodes, respectively.

In an embodiment, the grid formed by the first electrode and the third electrode and the grid formed by the second electrode and the fourth electrode are in different layers, respectively; and
a grid line of the grid formed by the first electrode and the third electrode is in a middle of a row of meshes of the grid formed by the second electrode and the fourth electrode to equally divide the row of meshes into two rows of meshes.

In an embodiment, each mesh is diamond-shaped or rectangular.

In an embodiment, the at least one touch unit includes a plurality of touch units in an array, and each of the plurality of touch units is configured to correspond to at least one pixel of a display panel.

In an embodiment, the second electrodes of the touch units in each row parallel to the first direction are connected to each other to form a driving electrode, and the first electrodes of the touch units in each column parallel to the second direction are connected to each other to form a sensing electrode.

In an embodiment, the touch substrate further includes a plurality of first signal electrodes and a plurality of second signal electrodes, wherein each of the plurality of first signal electrodes corresponds to and is connected to the sensing electrode for transmitting a capacitive touch sensing signal and a first electromagnetic touch signal, and each of the plurality of second signal electrodes corresponds to and is connected to the driving electrode for transmitting a capacitive touch driving signal and a second electromagnetic touch signal.

In an embodiment, the touch substrate further includes a black matrix outside each of the touch units and on a surface of the insulating layer proximal to the base substrate, wherein orthographic projections of the first and second signal electrodes on the base substrate are within an orthographic projection of the black matrix on the base substrate.

In an embodiment, the material of each of the electromagnetic touch electrodes is a giant magnetoresistance material.

In an embodiment, a material of each of the capacitive touch electrodes is a conductive material of metal.

In an embodiment, the touch substrate further includes a protection layer on a side of each of the at least one touch unit distal to the base substrate for protecting the at least one touch unit.

In an embodiment, a material of each of the protection layer and the insulating layer is a transparent insulating material.

Another aspect of the present disclosure provides a display device, which includes a display panel and the touch substrate according to any one of the foregoing embodiments of the present disclosure, wherein the touch substrate is on a display side of the display panel.

Still another aspect of the present disclosure provides a method for driving a touch substrate, wherein the touch substrate is the touch substrate according to any one of the foregoing embodiments of the present disclosure, and the method includes driving the capacitive touch electrodes and the electromagnetic touch electrodes of the touch substrate in a time-sharing manner.

DETAILED DESCRIPTION

Figure 1:
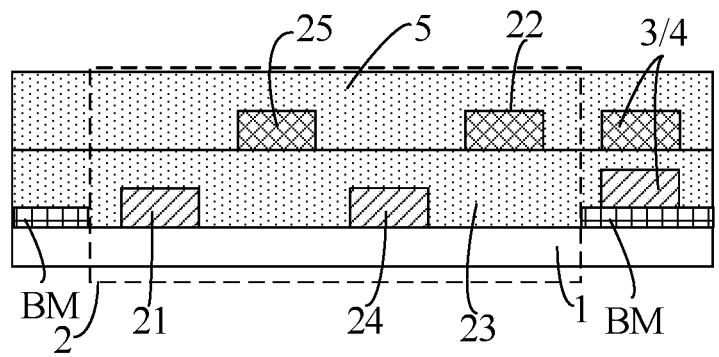
FIG. 1 is a schematic cross-sectional view illustrating a structure of a touch substrate according to an embodiment of the present disclosure.

To enable one of ordinary skill in the art to better understand technical solutions of the present disclosure, a touch substrate, a driving method thereof, and a display device provided by the present disclosure will be described in further detail below with reference to the accompanying drawings and exemplary embodiments.

The inventors of the present inventive concept have found that, an electromagnetic antenna board of an electromagnetic touch display panel in the related art is high in cost and large in volume because it alone needs to be provided with an electromagnetic identification sensor array, and will cause a display panel including the electromagnetic antenna board to have a large volume. Therefore, such an electromagnetic touch integrated technology limits the application of an electromagnetic touch technology to small-sized products.

An embodiment of the present disclosure provides a touch substrate, which includes a base substrate (or base plate or base layer) and at least one touch unit disposed on the base substrate. Each touch unit includes capacitive touch electrodes that include a first electrode and a second electrode, and an insulating layer is arranged between the first electrode and the second electrode. Each touch unit may further include electromagnetic touch electrodes, and a resistance of a material of each of the electromagnetic touch electrodes is changed when a magnetic field where the electromagnetic touch electrode is located is changed (e.g., each electromagnetic touch electrode may be made of a material whose resistance is changed under the action (or effect) of a magnetic field). The electromagnetic touch electrodes include a third electrode and a fourth electrode, and the insulating layer further extends between the third electrode and the fourth electrode. The third electrode and the first electrode are spaced apart from each other and are arranged on a same side of the base substrate side by side, and the fourth electrode and the second electrode are spaced apart from each other and are arranged on a side of the insulating layer distal to (i.e., far away from) the base substrate side by side. A capacitance may be generated between the third electrode and the second electrode, and a capacitance may be generated between the fourth electrode and the first electrode.

For example, each of the electromagnetic touch electrodes is made of a giant magnetoresistance material. The giant magnetoresistance material is a functional material whose resistance is changed significantly under the action of an external magnetic field. The giant magnetoresistance material has a giant magnetoresistance effect, which is a phenomenon that a resistivity of a magnetic material is greatly changed when the external magnetic field is present, compared with a resistivity of the magnetic material without the external magnetic field. For example, in general, the resistance of the giant magnetoresistance material is the maximum when the external magnetic field is zero, and decreases when the external magnetic field increases in a positive or negative direction.

Figure 2:
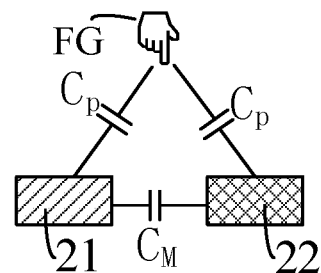
FIG. 2 is a schematic diagram illustrating the principle of capacitive touch of a touch substrate according to an embodiment of the present disclosure.

In the present embodiment, the principle of realizing capacitive touch between the first electrode and the second electrode is as follows. The first electrode may serve as a driving signal channel, and the second electrode may serve as a sensing signal channel, or vice versa. A mutual capacitance CM (as shown in FIG. 2) exists between the first electrode and the second electrode. When there is a touch by a finger FG, a capacitance Cp is formed between the finger FG and the first electrode and between the finger FG and second electrode, respectively, and a capacitance detected at a position of a touch point is C=CM+Cp. Therefore, the capacitance at the position of the touch point is changed by the touch of the finger FG, and the amount of the change ΔC in capacitance is ΔC=Cp. The position of the touch point is identified by the amount of change. The capacitive touch is touched by a finger FG, and the position of the touch is identified by detecting the change in capacitance at the touch position. In addition, in the present embodiment, the principle of realizing electromagnetic touch is as follows. When a touch is carried out by using an electromagnetic pen PN, the third electrode located in the layer where the first electrode is located and the fourth electrode located in the layer where the second electrode is located form an electromagnetic touch channel. The electromagnetic pen PN emits an electromagnetic wave WV, and under the action of the magnetic field of the electromagnetic wave WV, the resistances of the third electrode and the fourth electrode in a touch region radiated by the electromagnetic wave WV are changed sharply, such that a parasitic capacitance Cp2 between the first electrode and the fourth electrode in the touch region is changed, and meanwhile, a parasitic capacitance Cp1 between the second electrode and the third electrode in the touch region is changed. According to the changes of the parasitic capacitances Cp1 and Cp2, a position of the electromagnetic touch in a touch plane may be identified in a two-dimensional coordinate system.

It should be noted that the capacitive touch and the electromagnetic touch in the touch substrate may function independently and have no influence on each other. When the capacitive touch is carried out, the touch position for the finger is identified by detecting the amount of the change in capacitance between the touch position and the first electrode and between the touch position and the second electrode, respectively. During the process of the capacitive touch, the resistance of each electromagnetic touch electrode will not be changed, and the capacitance between each electromagnetic touch electrode and each capacitive touch electrode will not be changed. Therefore, the electromagnetic touch electrodes will not have any influence on a mutual capacitance touch. When an electromagnetic touch is carried out, the amount of the change in capacitance between the first electrode and the fourth electrode and the amount of the change in capacitance between the second electrode and the third electrode in the touch region for the electromagnetic pen are detected, thereby identifying the touch position for the electromagnetic pen. During the process of the electromagnetic touch, the capacitance between the first electrode and the second electrode will not be changed, and the amount of the change in capacitance between the third electrode and the fourth electrode does not contribute to identifying of the electromagnetic touch. Therefore, the capacitive touch electrodes may not have any negative effect on the electromagnetic touch.

In the touch substrate according to the present embodiment, by integrating the electromagnetic touch electrodes into the capacitive touch substrate, not only a thickness of the touch substrate with both the capacitive touch function and the electromagnetic touch function may be reduced to reduce a volume of the touch substrate, but also the manufacturing cost of the touch substrate with both the capacitive touch function and the electromagnetic touch function may be reduced to facilitate the popularization of the capacitive electromagnetic touch substrate, while both the capacitive touch function and the electromagnetic touch function of the touch substrate are realized.

Figure 3:
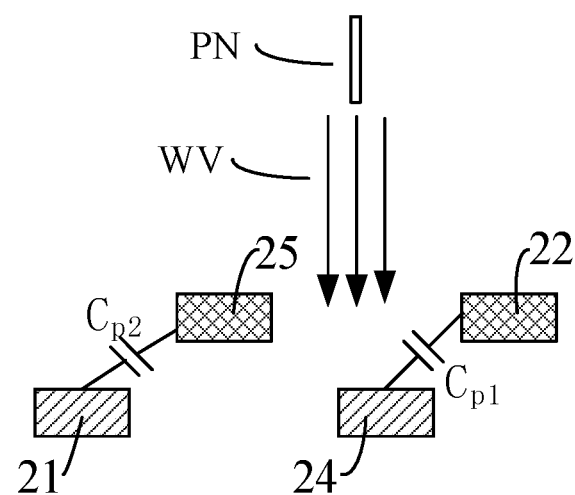
FIG. 3 is a schematic diagram illustrating the principle of electromagnetic touch of a touch substrate according to an embodiment of the present disclosure.

Another embodiment of the present disclosure provides a touch substrate as shown in FIGS. 1 to 3. The touch substrate includes a base substrate 1 and at least one touch unit 2 arranged on the base substrate 1. Each touch unit 2 may include the capacitive touch electrodes, and the capacitive touch electrodes may include a first electrode 21 and a second electrode 22. An insulating layer 23 is provided between the first electrode 21 and the second electrode 22. Each touch unit 2 may further include the electromagnetic touch electrodes, and each of the electromagnetic touch electrodes is made of a material (i.e., a giant magnetoresistance material) whose resistance is changed under the action of a magnetic field. The electromagnetic touch electrodes include a third electrode 24 and a fourth electrode 25. For example, the giant magnetoresistance material may include an intermetallic compound such as Sm—Mn—Ge, a perovskite-structured magnetic oxide film such as Nd—Pb—Mn—O, La—Ba—Mn—O, La—Ca—Mn—O, or the like. The insulating layer 23 also extends between the third electrode 24 and the fourth electrode 25. The third electrode 24 and the first electrode 21 are spaced apart from each other and are disposed side by side (in other words, the third electrode 24 and the first electrode 21 are electrically isolated from each other and disposed alternately) on a same side of the base substrate 1 (e.g., the upper side of the base substrate 1 in FIG. 1), and the insulating layer 23 may cover the base substrate 1, the first electrode 21 and the third electrode 24. The fourth electrode 25 and the second electrode 22 are spaced apart from each other and are disposed side by side (in other words, the fourth electrode 25 and the second electrode 22 are electrically isolated from each other and disposed alternately) on a side of the insulating layer 23 distal to the base substrate 1. A capacitance may be generated between the third electrode 24 and the second electrode 22, and a capacitance may be generated between the fourth electrode 25 and the first electrode 21.

In the present embodiment, the first electrode 21 and the third electrode 24 are disposed in a same layer, and the second electrode 22 and the fourth electrode 25 are disposed in a same layer. That is, both the capacitive touch electrodes (i.e., the first electrode 21 and the second electrode 22) are distributed in two layers, and the electromagnetic touch electrodes (i.e., the third electrode 24 and the fourth electrode 25) are distributed in two layers, as shown in FIG. 1. As described above, each electromagnetic touch electrode is made of the giant magnetoresistance material.

For example, the principle of realizing a capacitive touch between the first electrode 21 and the second electrode 22 is as follows. The first electrode 21 may serve as a driving signal channel and the second electrode 22 may serve as a sensing signal channel (or vice versa). As shown in FIG. 2, a mutual capacitance $C_M$ exists between the first electrode 21 and the second electrode 22. When a touch is performed by a finger (as shown in the top of FIG. 2), the capacitance $C_p$ is formed between the finger and each of the first electrode 21 and the second electrode 22, and a capacitance detected at the position of a touch point is $C=C_M+C_p$. Under the touch by the finger, the capacitance at the position of the touch point is changed, and the change ΔC in capacitance is ΔC=$C_p$, which allows the position of the touch point to be identified according to the change in capacitance. In the capacitive touch, a touch is performed a finger, and the touch position is identified by detecting the change in capacitance at the touch position. In addition, in the present embodiment, the principle of realizing electromagnetic touch is as follows. When a touch is performed by using an electromagnetic pen (as shown in the top of FIG. 3), the third electrode 24 located in the layer where the first electrode 21 is located and the fourth electrode 25 located in the layer where the second electrode 22 is located form an electromagnetic touch channel. The electromagnetic pen may emit an electromagnetic wave. Under the action of a magnetic field of the electromagnetic wave, the resistances of the third electrode 24 and the fourth electrode 25 in the touch region to which the electromagnetic wave is radiated are changed sharply, which causes the parasitic capacitance $C_{p2}$ between the first electrode 21 and the fourth electrode 25 in the touch region to be changed, and at the same time causes the parasitic capacitance $C_{p1}$ between the second electrode 22 and the third electrode 24 in the touch region to be changed. The position of the electromagnetic touch in a touch plane may be identified in a two-dimensional coordinate system, according to changes in the parasitic capacitances $C_{p1}$ and $C_{p2}$.

It should be noted that the capacitive touch and the electromagnetic touch in the touch substrate may be performed independently and may not have any influence on each other. When the capacitive touch is performed, the amount of the change in capacitance between the first electrode 21 and the second electrode 22 is detected at the position of the touch point, thereby identifying the touch position for the finger. In the process of the capacitive touch, the resistance of each of the electromagnetic touch electrodes will not be changed, and the capacitance between each electromagnetic touch electrode and the capacitive touch electrode corresponding to the electromagnetic touch electrode will not be changed. Therefore, the electromagnetic touch electrodes have no influence on the mutual capacitance touch. When the electromagnetic touch is performed, the amount of the change in capacitance between the first electrode 21 and the fourth electrode 25 and the amount of the change in capacitance between the second electrode 22 and the third electrode 24 in the touch region for the electromagnetic pen are detected, thereby identifying the touch position for the electromagnetic pen. In the process of the electromagnetic touch, the capacitance between the first electrode 21 and the second electrode 22 will not be changed, and the amount of the change in capacitance between the third electrode 24 and the fourth electrode 25 does not contribute to identifying of the electromagnetic touch. Therefore, the capacitive touch electrodes may not have a negative effect on the electromagnetic touch.

In the present embodiment, as shown in FIGS. 4 to 10, in a plan view (e.g., a plan view from the top of FIG. 1), the third electrode 24 and the fourth electrode 25 are disposed at staggered positions, respectively, and the first electrode 21 and the second electrode 22 are disposed at staggered positions, respectively. Compared with the case where the third electrode 24 and the fourth electrode 25 overlap each other and the first electrode 21 and the second electrode 22 overlap each other, the above-described arrangement of the present embodiment may reduce a fixed (i.e., invariable) portion of each capacitance detected when the capacitive touch and the electromagnetic touch are performed and may increase a variable portion of each capacitance detected, thereby improving the touch sensitivity of each of the capacitive touch and the electromagnetic touch. In other words, in the present embodiment, the third electrode 24 and the fourth electrode 25 are respectively distributed at staggered positions and do not overlap each other in a direction perpendicular to the base substrate 1 (i.e., a vertical direction in FIG. 1, or a stacking direction of the insulating layer 23 and the base substrate 1), and the first electrode 21 and the second electrode 22 are respectively distributed at staggered positions and do not overlap each other in the direction perpendicular to the base substrate 1.

Figure 4:
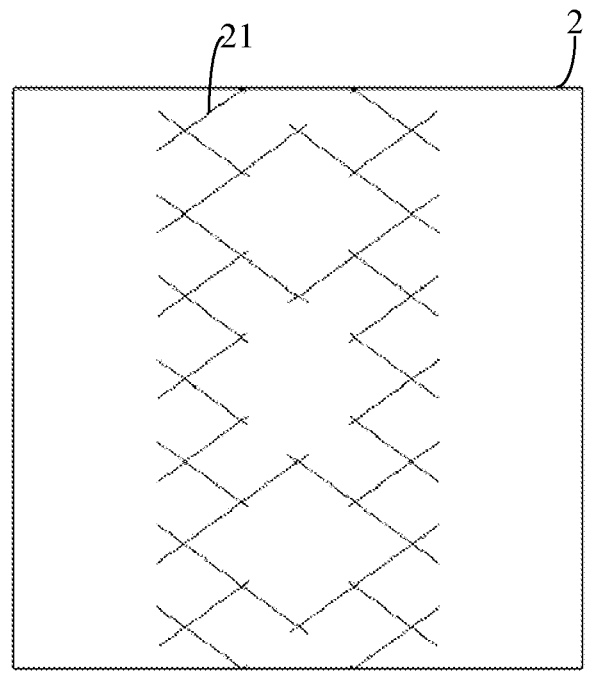
FIG. 4 is a schematic top view illustrating a structure of a first electrode of a touch substrate according to an embodiment of the present disclosure.
Figure 6:
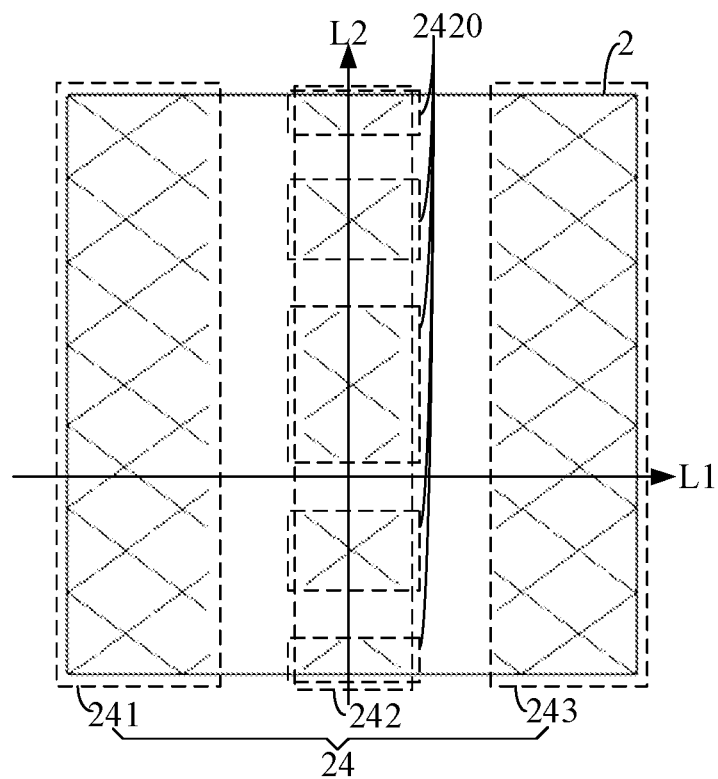
FIG. 6 is a schematic top view illustrating a structure of a third electrode of a touch substrate according to an embodiment of the present disclosure.
Figure 8:
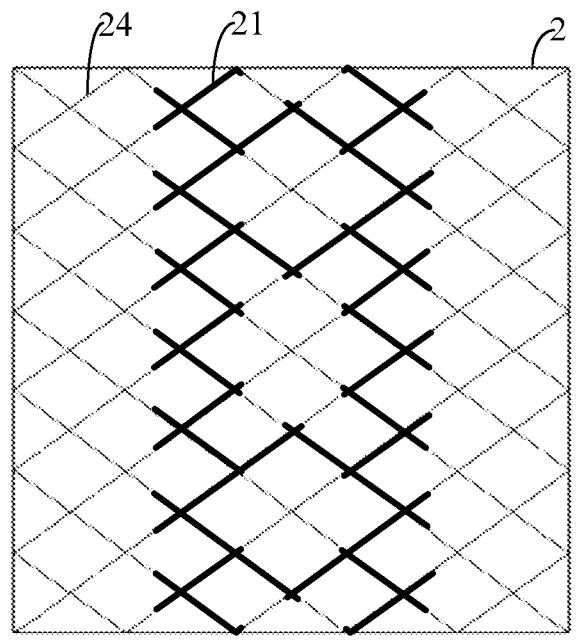
FIG. 8 is a schematic top view illustrating structures of a first electrode and a third electrode of a touch substrate according to an embodiment of the present disclosure.

In the present embodiment, as an example, in each touch unit 2, the third electrode 24 includes a first portion 241, a second portion 242, and a third portion 243 spaced apart from each other along a first direction L1 (e.g., the horizontal direction in FIG. 6), and the second portion 242 includes a plurality of sub-portions 2420 spaced apart from each other along a second direction L2 (e.g., the vertical direction in FIG. 6). The first electrode 21 is distributed between the first portion 241, the second portion 242, and the third portion 243, and has a plurality of openings for housing the plurality of sub-portions 2420 (as shown in FIGS. 4, 6, and 8). The first direction L1 may be perpendicular to the second direction L2, as shown in FIG. 6. It should be noted that the first portion 241, the second portion 242 and the third portion 243 of the third electrode 24 may be disconnected from each other, electrode lines in the plurality of sub-portions 2420 of the second portion 242 need not be completely connected together. That is, the portions of the third electrode 24 need not be connected to each other, and the electrode lines in the plurality of sub-portions 2420 of the second portion 242 need not be connected to each other, as long as the electrode lines (or wires) are arranged as described above to form the third electrode 24. Further, the first electrode 21 may include a plurality of electrode lines, and the plurality of electrode lines may cross each other to form a grid. The grid may have diamond-shaped or rectangular meshes (i.e., apertures or holes), as shown in FIG. 4. Each of the first portion 241, the plurality of sub-portions 2420 of the second portion 242, and the third portion 243 of the third electrode 24 may include a plurality of electrode lines, which may cross each other to form a grid, and the grid may have diamond-shaped or rectangular meshes, as shown in FIG. 6. The first and third electrodes 21 and 24 spaced apart from each other and arranged side by side may form a uniform grid, i.e., meshes of the grid formed by the first and third electrodes 21 and 24 may have a same shape (e.g., diamond or rectangle) and a same area, as shown in FIG. 8.

Figure 5:
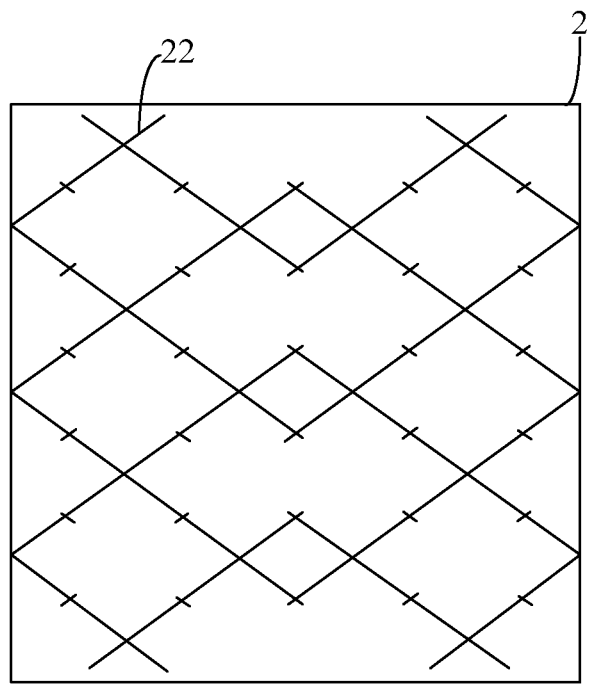
FIG. 5 is a schematic top view illustrating a structure of a second electrode of a touch substrate according to an embodiment of the present disclosure.
Figure 7:
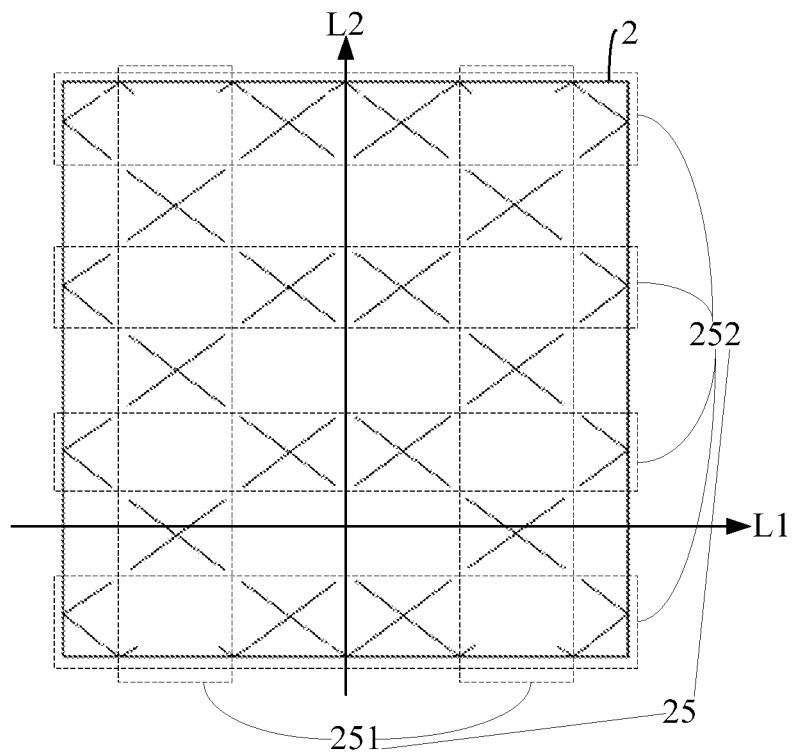
FIG. 7 is a schematic top view illustrating a structure of a fourth electrode of a touch substrate according to an embodiment of the present disclosure.

Further, as an example, in each touch unit 2, the fourth electrode 25 includes a plurality of fourth portions 251 spaced apart from each other along the first direction L1 and a plurality of fifth portions 252 spaced apart from each other along the second direction L2, and the second electrode 22 is distributed between the plurality of fourth portions 251 and between the plurality of fifth portions 252. It should be noted that the fourth portions 251 and the fifth portions 252 of the fourth electrode 25 may be disconnected from each other, electrode lines of the fourth portions 251 need not to be completely connected together, and electrode lines of the fifth portions 252 need not to be completely connected together neither. That is, the portions of the fourth electrode 25 need not to be connected to each other, and the electrode lines of each of the portions need not to be completely connected together, as long as the electrode lines are arranged as described above to form the fourth electrode 25. Further, the second electrode 22 may include a plurality of electrode lines, and the plurality of electrode lines may cross each other to form a grid. The grid may have diamond-shaped or rectangular meshes, as shown in FIG. 5. Each of the fourth portions 251 and the fifth portions 252 of the fourth electrode 25 may include a plurality of electrode lines, and the plurality of electrode lines may cross each other to form a grid. The grid may have diamond-shaped or rectangular meshes, as shown in FIG. 7. The second electrode 22 and the fourth electrode 25 spaced apart from each other and arranged side by side may form a uniform grid, i.e., meshes of the grid formed by the second electrode 22 and the fourth electrode 25 may have a same shape (e.g., diamond or rectangle) and a same area, as shown in FIG. 9.

Figure 9:
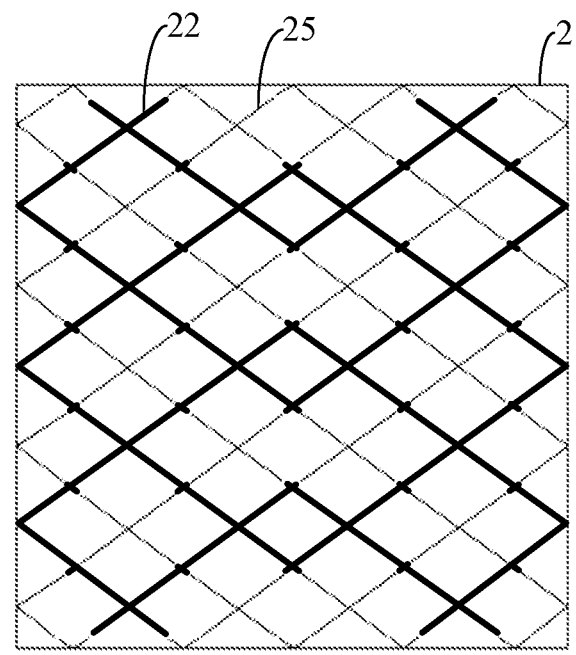
FIG. 9 is a schematic top view illustrating structures of a second electrode and a fourth electrode of a touch substrate according to an embodiment of the present disclosure.

In the present embodiment, the shape and the area of each mesh of the grid formed by the first electrode 21 and the third electrode 24 may be the same as the shape and the area of each mesh of the grid formed by the second electrode 22 and the fourth electrode 25, respectively, as shown in FIGS. 8 and 9.

Figure 10:
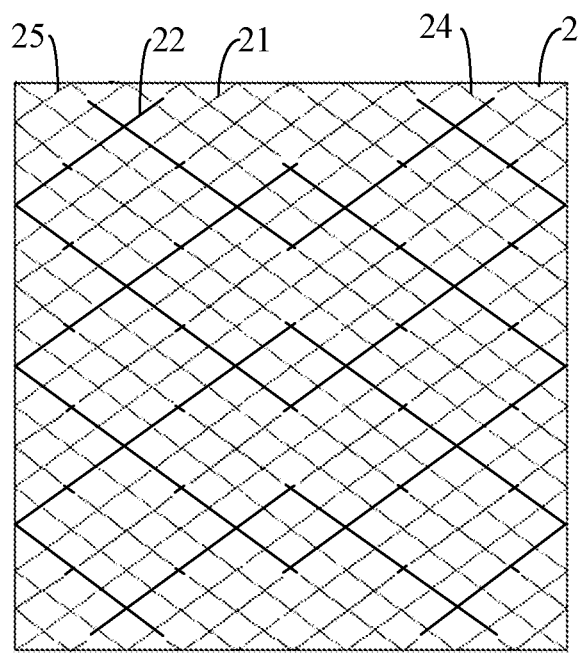
FIG. 10 is a schematic top view illustrating structures of a first electrode, a second electrode, a third electrode, and a fourth electrode of a touch substrate according to an embodiment of the present disclosure.

In the present embodiment, grid lines of the grid formed by the first electrode 21 and the third electrode 24 may be located at the middles of rows of meshes of the grid formed by the second electrode 22 and the fourth electrode 25 (e.g., the grid lines bisect (i.e., equally divide) each of the rows of meshes into two rows of meshes), respectively. In other words, in a plan view, an area of each mesh of the grid (as shown in FIG. 10) formed by the first electrode 21, the second electrode 22, the third electrode 24, and the fourth electrode 25 may be equal to half the area of each mesh of the grid (as shown in FIG. 8) formed by the first electrode 21 and the third electrode 24, or equal to half the area of each mesh of the grid (as shown in FIG. 9) formed by the second electrode 22 and the fourth electrode 25. Further, each mesh of the grid formed by the first electrode 21, the second electrode 22, the third electrode 24, and the fourth electrode 25 may be diamond-shaped or rectangular in the plan view, as shown in FIG. 10.

The above distribution (or arrangement) of the capacitive touch electrodes and the electromagnetic touch electrodes may realize not only the distribution of the capacitive touch electrodes over an entire surface in the region where the touch unit 2 is located, but also the distribution of the electromagnetic touch electrodes over the entire surface in the region where the touch unit 2 is located, thereby facilitating the integration of capacitive electromagnetic touch (i.e., both the capacitive touch function and the electromagnetic touch function).

In the present embodiment, as described above, each of the first electrode 21, the second electrode 22, the third electrode 24, and the fourth electrode 25 may be distributed in a grid. With such an arrangement, it may be ensured that the touch substrate has a desired light transmittance, such that a display function is not influenced while the touch functions are realized.

For example, the meshes of the grids respectively formed by the first electrode 21, the second electrode 22, the third electrode 24, and the fourth electrode 25 may have a same size and a same shape. With such an arrangement, on one hand, the capacitive touch and the electromagnetic touch may be controlled more easily, and on the other hand, if sizes and/or shapes of the meshes of the grids respectively formed by the capacitive touch electrodes and the electromagnetic touch electrodes are different, the grids are easy to be visually identified, which will have a negative effect on the display function. Therefore, the above arrangement of the capacitive touch electrodes and the electromagnetic touch electrodes may avoid the negative effect on the display function.

Figure 11:
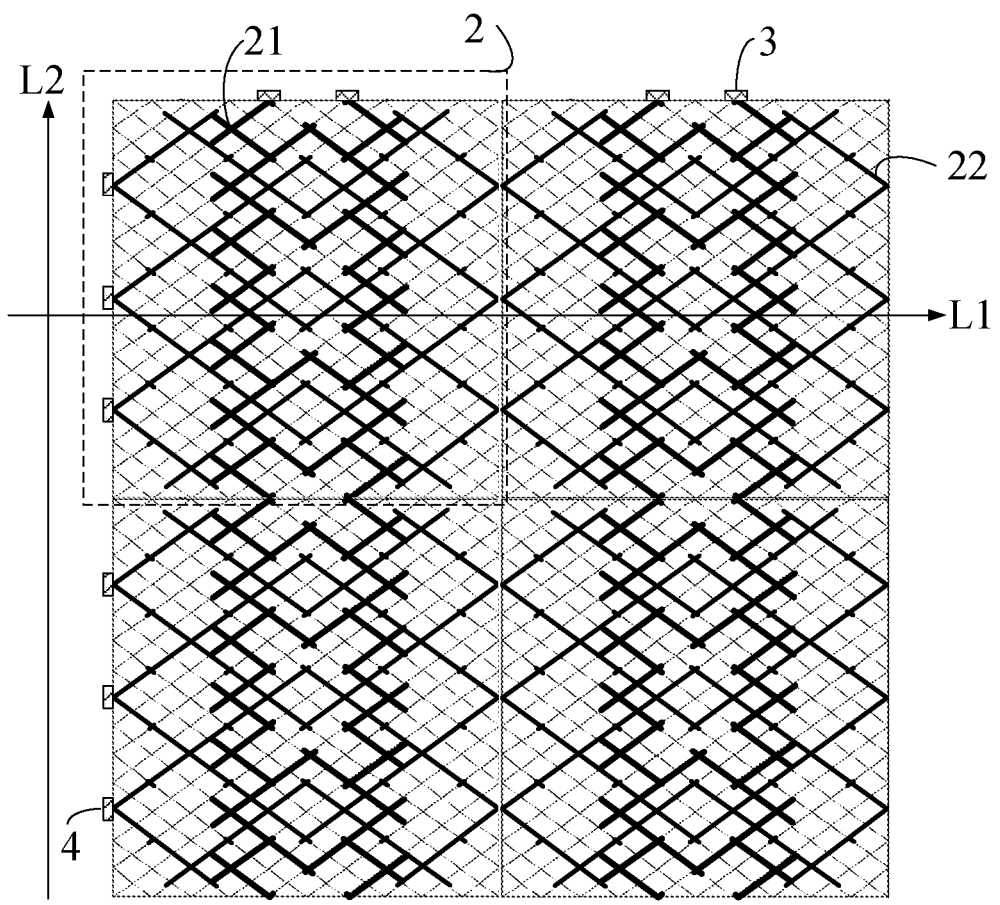
FIG. 11 is a schematic top view illustrating a structure of a touch substrate with a plurality of touch units disposed thereon, according to an embodiment of the present disclosure.

In the present embodiment, as shown in FIG. 11, a plurality of touch units 2 may be arranged on the base substrate 1 and in an array, and each of the plurality of touch units 2 may correspond to at least one of pixels of a display panel. In other words, the plurality of touch units 2 may be in one-to-one correspondence with the pixels of the display panel. Therefore, touch function may be realized over an entire surface of the touch substrate. For example, FIG. 11 shows four touch units 2, but the present disclosure is not limited thereto. For example, the number of touch units 2 may be greater or less than 4. In addition, FIG. 10 may be one of the touch units 2 shown in FIG. 11.

In the present embodiment, the second electrodes 22 of the touch units 2 in each row parallel to the first direction L1 may be connected to each other to form a driving electrode, and the first electrodes 21 of the touch units 2 in each column parallel to the second direction L2 may be connected to each other to form a sensing electrode. Such an arrangement realizes the distribution of the capacitive touch electrodes over an entire surface of the touch substrate, which is beneficial to realizing the touch function over the entire surface of the touch substrate (i.e., each portion of the entire surface has the touch function). It should be noted that the driving electrodes are not connected to each other in the column direction, and the sensing electrodes are not connected to each other in the row direction. In addition, the touch substrate is provided with a plurality of driving electrodes parallel to the first direction L1 and a plurality of sensing electrodes parallel to the second direction L2.

For example, the touch substrate may further include a plurality of first signal electrodes 3 and a plurality of second signal electrodes 4. The plurality of first signal electrodes 3 are in one-to-one correspondence with the sensing electrodes and are connected to the sensing electrodes, respectively. That is, each of the first signal electrodes 3 is connected to the corresponding sensing electrode and may transmit a capacitive touch sensing signal and a first electromagnetic touch signal. The plurality of second signal electrodes 4 are in one-to-one correspondence with the driving electrodes and are connected to the driving electrodes, respectively. That is, each of the second signal electrodes 4 is connected to the corresponding driving electrode and may transmit a capacitive touch driving signal and a second electromagnetic touch signal. In addition, each of the electromagnetic touch electrodes is not connected to the first signal electrode 3 or the second signal electrode 4. For example, the first electromagnetic touch signal may be used for obtaining a position of the electromagnetic pen, which performs the electromagnetic touch, on an X-axis of a two-dimensional coordinate system for the touch substrate, and the second electromagnetic touch signal may be used for obtaining a position of the electromagnetic pen, which performs the electromagnetic touch, on a Y-axis of the two-dimensional coordinate system for the touch substrate, thereby determining a position of the electromagnetic touch performed by the electromagnetic pen. With such a configuration, the cost that an electromagnetic touch signal transmission electrode needs to be arranged independently in a case where an electromagnetic touch substrate is arranged independently is saved. For example, the X-axis may extend along the first direction L1, the Y-axis may extend along the second direction L2, and an origin of the two-dimensional coordinate system (i.e., the XY coordinate system) may be one vertex (e.g., the lower left vertex in FIG. 11) of the touch substrate.

The process of identifying a position of the electromagnetic touch on the touch substrate is as follows. Under the action of the magnetic field of the electromagnetic wave emitted from the electromagnetic pen, the resistances of the third electrode 24 and the fourth electrode 25 in the touch region to which the electromagnetic wave is radiated are changed sharply, which allows the second signal electrode 4 connected to the second electrode 22 in the touch region to output the change in parasitic capacitance $C_{p1}$ between the second electrode 22 and the third electrode 24 in the touch region, so as to determine the position of the electromagnetic touch on the Y-axis of the two-dimensional coordinate system for the touch substrate. Meanwhile, the first signal electrode 3 connected to the first electrode 21 in the touch region outputs the change in parasitic capacitance $C_{p2}$ between the first electrode 21 and the fourth electrode 25 in the touch region, so as to determine the position of the electromagnetic touch on the X-axis of the two-dimensional coordinate system for the touch substrate. Finally, the position of the electromagnetic touch in the two-dimensional coordinate system is identified.

As an example, orthographic projections of the first signal electrodes 3 and the second signal electrodes 4 on the base substrate 1 are located within an orthographic projection of a black matrix BM on the base substrate 1. Such an arrangement of the first signal electrodes 3 and the second signal electrodes 4 is prevented from blocking light for display on a display panel integrated with the touch substrate. It should be understood that the black matrix BM may be located outside each of the touch units 2 of the touch substrate and between the insulating layer 23 and the base substrate 1, as shown in FIG. 1. However, the present disclosure is not limited thereto, and for example, the black matrix BM may be located outside each of the touch units 2 of the touch substrate and between the insulating layer 23 and a protection layer 5.

In the present embodiment, the capacitive touch electrodes (i.e., the first electrode 21 and the second electrode 22) are made of a conductive material of metal. The conductive material of metal may allow the capacitive touch to be more sensitive, thereby achieving a better capacitive touch effect.

In the present embodiment, as shown in FIG. 1, the touch substrate may further include the protection layer 5, and the protection layer 5 is disposed on a side of each touch unit 2 distal to the base substrate 1 to protect the touch unit 2. The protection layer 5 may cover the insulating layer 23, the second electrode 22, and the fourth electrode 25. For example, each of the protection layer 5 and the insulating layer 23 may be made of a transparent organic material or a transparent inorganic material, which may allow the touch substrate to be transparent. The base substrate 1 may be made of glass or a transparent organic material.

It should be noted that the first electrode 21, the second electrode 22, the third electrode 24, and the fourth electrode 25 may alternatively be disposed in different layers, respectively. That is, the capacitive touch electrodes and the electromagnetic touch electrodes may be distributed in four layers. Such an arrangement may also realize integration of the capacitive touch and the electromagnetic touch, but compared with the arrangement of the touch substrate as described above, the overall thickness of the touch substrate will be increased, a volume of the touch substrate will be increased, and two additional insulating layers are required to be formed in the manufacturing process.

Based on the above structure of the touch substrate, the present embodiment further provides a method for driving (i.e., a driving method for) the touch substrate, and the method includes driving the capacitive touch electrodes and the electromagnetic touch electrodes of the touch substrate in a time-sharing (or time-division) manner, to implement the capacitive touch function and the electromagnetic touch function of the touch substrate.

The method for driving the touch substrate may include the following steps: when the capacitive touch is to be performed, a capacitive touch driving signal is input to the driving electrodes (e.g., the second electrodes 22) through the second signal electrodes 4, and a capacitive touch sensing signal is output through the first signal electrodes 3 at the same time when the capacitive touch driving signal is input to the driving electrodes. At this time, a second electromagnetic touch signal cannot be input to the second signal electrodes 4, and the first signal electrodes 3 cannot output a first electromagnetic touch signal. Similarly, when the electromagnetic touch is to be performed, a second electromagnetic touch signal is input through the second signal electrodes 4, and a first electromagnetic touch signal is output through the first signal electrodes 3.

The embodiments shown in FIGS. 1 to 11 achieve at least the following advantageous effects. In the touch substrate according to any one of the embodiments shown in FIGS. 1 to 11, the electromagnetic touch electrodes are integrated into the capacitive touch substrate, which allows to realize both the capacitive touch function and the electromagnetic touch function of the touch substrate, and meanwhile, not only a thickness of the touch substrate having both the capacitive touch function and the electromagnetic touch function may be reduced to reduce a volume of the touch substrate, but also the manufacturing cost of the touch substrate having both the capacitive touch function and the electromagnetic touch function may be reduced to facilitate the popularization of this capacitive electromagnetic touch substrate.

Another embodiment of the present disclosure provides a display device, which includes a display panel and the touch substrate according to any one of the embodiments shown in FIGS. 1 to 11. The touch substrate is arranged on a display side of the display panel.

By including the touch substrate according to any one of the embodiments shown in FIGS. 1 to 11, the display device may realize integration of the capacitive touch function and the electromagnetic touch function, and does not requires an additional electromagnetic identification sensor array compared with an existing display device capable of realizing integration of a capacitive touch function and an electromagnetic touch function. Thus, the volume and the manufacturing cost of the display device may be reduced.

The display device provided by the present disclosure may be any product or component having a display function, such as an LCD (liquid crystal display) panel, an LCD television, an OLED (organic light emitting diode) panel, an OLED television, a display, a mobile phone, a navigator, or the like, or may be a semi-finished product of the product or component having a display function as described above.

It should be understood that the foregoing embodiments are merely exemplary embodiments for illustrating the principle of the present disclosure, and the present disclosure is not limited thereto. It will be apparent to one of ordinary skill in the art that various changes and modifications may be made without departing from the scope of the present disclosure as defined by the appended claims, and such changes and modifications also fall within the scope of the present disclosure.

What is claimed is:

1. A touch substrate, comprising a base substrate and at least one touch unit on the base substrate, wherein
   each of the at least one touch unit comprises capacitive touch electrodes and electromagnetic touch electrodes;
   the capacitive touch electrodes comprise a first electrode and a second electrode, and an insulating layer is between the first electrode and the second electrode;
   a resistance of a material of each of the electromagnetic touch electrodes is changed when a magnetic field where the electromagnetic touch electrode is located is changed, the electromagnetic touch electrodes comprise a third electrode and a fourth electrode, and the insulating layer further extends between the third electrode and the fourth electrode;
   the third electrode and the first electrode are spaced apart from each other and are side by side on a same side of the base substrate, and the fourth electrode and the second electrode are spaced apart from each other and are side by side on a side of the insulating layer distal to the base substrate;

wherein the at least one touch unit comprises a plurality of touch units in an array, and each of the plurality of touch units is configured to correspond to at least one pixel of a display panel; and wherein the second electrodes of the touch units in each row parallel to the first direction are connected to each other to form a driving electrode, and the first electrodes of the touch units in each column parallel to the second direction are connected to each other to form a sensing electrode.

2. The touch substrate according to claim 1, wherein the third electrode and the fourth electrode are at staggered positions, respectively, and the first electrode and the second electrode are at staggered positions, respectively.

3. The touch substrate according to claim 2, wherein in each of the at least one touch unit, the third electrode comprises a first portion, a second portion and a third portion spaced apart from each other along a first direction, the second portion comprises a plurality of sub-portions spaced apart from each other along a second direction, the first electrode is between the first portion, the second portion and the third portion and has a plurality of openings for housing the plurality of sub-portions, respectively, and the first direction is perpendicular to the second direction.

4. The touch substrate according to claim 3, wherein in each of the at least one touch unit, the fourth electrode comprises a plurality of fourth portions spaced apart from each other along the first direction and a plurality of fifth portions spaced apart from each other along the second direction, and the second electrode is between the plurality of fourth portions and between the plurality of fifth portions.

5. The touch substrate according to claim 4, wherein each of the first electrode, the second electrode, the third electrode and the fourth electrode is distributed in a grid.

6. The touch substrate according to claim 5, wherein the grid formed by the first electrode, the second electrode, the third electrode, and the fourth electrode comprises meshes, shapes of the meshes are identical to each other, and areas of the meshes are equal to each other.

7. The touch substrate according to claim 6, wherein each mesh is diamond-shaped or rectangular.

8. The touch substrate according to claim 4, wherein the first electrode and the third electrode form a grid, and meshes of the grid formed by the first electrode and the third electrode have shapes identical to each other and areas equal to each other; and the second electrode and the fourth electrode form a grid, and meshes of the grid formed by the second electrode and the fourth electrode have shapes identical to each other and areas equal to each other.

9. The touch substrate according to claim 8, wherein the shape and the area of each of the meshes of the grid formed by the first and third electrodes are equal to the shape and the area of each of the meshes of the grid formed by the second and fourth electrodes, respectively.

10. The touch substrate according to claim 9, wherein the grid formed by the first electrode and the third electrode and the grid formed by the second electrode and the fourth electrode are in different layers, respectively; and an area of each mesh of a grid formed by the first electrode, the second electrode, the third electrode, and the fourth electrode is equal to half an area of each mesh of the grid formed by the first electrode and the third electrode, or equal to half an area of each mesh of the grid formed by the second electrode and the fourth electrode.

11. The touch substrate according to claim 1, further comprising a plurality of first signal electrodes and a plurality of second signal electrodes, wherein each of the plurality of first signal electrodes corresponds to and is connected to the sensing electrode for transmitting a capacitive touch sensing signal and a first electromagnetic touch signal, and each of the plurality of second signal electrodes corresponds to and is connected to the driving electrode for transmitting a capacitive touch driving signal and a second electromagnetic touch signal.

12. The touch substrate according to claim 11, further comprising a black matrix outside each of the touch units and on a surface of the insulating layer proximal to the base substrate, wherein orthographic projections of the first and second signal electrodes on the base substrate are within an orthographic projection of the black matrix on the base substrate.

13. The touch substrate according to claim 1, wherein the material of each of the electromagnetic touch electrodes is a giant magnetoresistance material.

14. The touch substrate according to claim 1, wherein a material of each of the capacitive touch electrodes is a conductive material of metal.

15. The touch substrate according to claim 1, further comprising a protection layer on a side of each of the at least one touch unit distal to the base substrate for protecting the at least one touch unit.

16. The touch substrate according to claim 15, wherein a material of each of the protection layer and the insulating layer is a transparent insulating material.

17. A display device, comprising a display panel and the touch substrate according to claim 1, wherein the touch substrate is on a display side of the display panel.

18. A method for driving a touch substrate, wherein the touch substrate is the touch substrate according to claim 1, and the method comprises driving the capacitive touch electrodes and the electromagnetic touch electrodes of the touch substrate in a time-sharing manner.

* * * * *